United States Patent
Wagner et al.

(10) Patent No.: US 7,887,662 B2
(45) Date of Patent: Feb. 15, 2011

(54) CORRUGATED HOSE WITH NON-CONFORMING OUTER LAYER FOR DISPENSING LOOSE-FILL INSULATION

(75) Inventors: Christophe Wagner, Lansdale, PA (US); Michael La Salle, Collegeville, PA (US); Ed Pentz, Boyertown, PA (US); Andreas Unruh, Hatfield, PA (US); Ed Nieradko, Lutz, FL (US)

(73) Assignee: Certainteed Corporation, Valley Forge, PA (US)

( * ) Notice: Subject to any disclaimer, the term of this patent is extended or adjusted under 35 U.S.C. 154(b) by 1256 days.

(21) Appl. No.: 11/379,472

(22) Filed: Apr. 20, 2006

(65) Prior Publication Data
US 2007/0246118 A1 Oct. 25, 2007

(51) Int. Cl.
*B29C 53/78* (2006.01)
*B29C 53/00* (2006.01)
*B65C 3/16* (2006.01)
*B32B 37/00* (2006.01)
*F16L 11/00* (2006.01)

(52) U.S. Cl. .............. 156/195; 156/215; 156/218; 156/292; 156/294; 138/122

(58) Field of Classification Search ........... 156/143, 156/144, 184, 185, 187, 188, 189, 190, 191, 156/194, 195, 196, 199, 200, 201, 203, 205, 156/206, 207, 210, 212, 213, 215, 217, 218, 156/242, 243, 244.11, 244.12, 244.13, 244.15, 156/292, 293, 294, 324; 138/111, 114, 118, 138/121, 122, 137, 140, 141, 148

See application file for complete search history.

(56) References Cited

U.S. PATENT DOCUMENTS

| | | | |
|---|---|---|---|
| 4,419,256 A | 12/1983 | Loomis | |
| 5,312,658 A | 5/1994 | Griffith | |
| 5,389,167 A | 2/1995 | Sperber | |
| 5,697,198 A | 12/1997 | Ponder et al. | |
| 6,016,848 A * | 1/2000 | Egres, Jr. | 138/137 |
| 6,082,639 A | 7/2000 | Pentz et al. | |
| 6,206,050 B1 | 3/2001 | Kelley et al. | |
| 6,206,505 B1 | 3/2001 | Yoshihira et al. | |
| 6,371,148 B1 | 4/2002 | Tripp | |
| 6,401,757 B1 | 6/2002 | Pentz et al. | |
| 6,503,026 B1 | 1/2003 | Mitchell | |
| 6,648,022 B2 | 11/2003 | Pentz et al. | |
| 6,719,864 B2 * | 4/2004 | Kelley et al. | 156/143 |
| 2001/0010235 A1 | 8/2001 | Kelley et al. | |
| 2003/0057142 A1 | 3/2003 | Pentz et al. | |
| 2004/0200537 A1 * | 10/2004 | Rivest | 138/109 |
| 2005/0268979 A1 * | 12/2005 | Hibino et al. | 138/121 |

FOREIGN PATENT DOCUMENTS

EP 1 146 272 A1 10/2001
EP 1146272 A1 * 10/2001

* cited by examiner

Primary Examiner—Richard Crispino
Assistant Examiner—Brian R Slawski
(74) Attorney, Agent, or Firm—Duane Morris LLP

(57) ABSTRACT

A hose assembly comprises: a flexible corrugated inner hose suitable for conveying and dispensing loose-fill insulation material, and a non-conforming outer hose snugly fitted about the inner hose, the outer hose having a substantially cylindrical outer surface that is substantially free of corrugations.

8 Claims, 4 Drawing Sheets

CORRUGATED HOSE WITH NON-CONFORMING OUTER LAYER FOR DISPENSING LOOSE-FILL INSULATION

FIELD OF THE INVENTION

The present invention relates to a hose for conveying loose-fill insulation materials, and methods of dispensing insulation using the hose.

BACKGROUND

Because of cost-effectiveness, speed and ease of application, as well as thoroughness of coverage in both open and confined areas, the practice of using pneumatically delivered or "blown" loose-fill insulation materials, e.g., glass fiber, rock wool, mineral wool, cellulose fibers, expanded mica, and the like, has continued to be a popular method by which to install insulation in new and existing building constructions.

Loose-fill insulation blown into ceilings and outside wall cavities is very effective in reducing heat transfer in existing buildings. Exterior wall cavities of finished rooms may be filled with blown insulation through holes bored in exterior siding, or the like, without removing or cutting the interior wall surfacing materials. In addition, loose-fill blown insulation can be used in new construction, where insulative batts are often used.

Loose-fill insulation can provide a substantial advantage over batt-type insulation in that the loose-fill material readily assumes the actual shape of the interior cavity being filled, whereas the insulative batts are manufactured in a limited number of standard size widths, none of which as closely match actual dimensions of some wall cavities or accommodate obstructions which may be encountered in the field. Properly installed, loose-fill insulation essentially completely fills the wall cavity, conforming to the actual shape of the wall cavity, including obstructions, and provides resistance to heat transfer through the wall. Loose-fill insulation also lends itself to installation in ceilings, party walls and any other place where it is desired to resist heat transfer, as an alternative to batts, especially where there are obstructions such as, water, waste and gas lines, electrical conduits, heating and air conditioning ducts, etc.

The essential components of a typical blown loose-fill delivery system include a source of insulation material such as a hopper or the like, a conduit or hose for conveying the material from the insulation source to the installation site, and a source of pressurized air such as a compressor, blower or the like, for entraining the fibrous and/or particulate loose-fill insulation material and delivering it from its source and through the hose for discharge at the installation site.

When installing loosefill insulation in a house, an installer typically uses about 46 to 61 meters (about 150 to 200 feet) of corrugated hose, having a diameter between about 7.5 cm (3 inches) and 10 cm (4 inches). Exemplary hoses are described in U.S. Pat. No. 6,206,050, which is incorporated by reference herein in its entirety. FIG. 1 shows a tube 100 according to that patent, comprising an inner web 130 surrounded by an outer cap 120. The inner web 130 is formed in a cylindrical shape, and the outer cap 120 is formed as a helical member extending around the outer periphery of the inner web 120. The inner web 130 includes a first helical projection 131 which extends around its entire outer periphery. The inner web 130 also includes a second helical projection 140 which extends around its inner periphery. The first helical projection 131 extends away from a longitudinal axis A of the inner web 130, and the second helical projection 140 extends towards the longitudinal axis A of the inner web 130. The outer cap 120 comprises a helical member 121 which is wound around the outer periphery of the inner web 130 and which is disposed at a position substantially aligned with helical projection 140, and in between portions of the helical projection 131. In operation, as insulation is blown through the tube 100 by an insulation dispensing apparatus, the insulation collides with the different portions of helical projection 140, and is further "opened up" or conditioned. The patent indicates that the tube 100 may comprise the inner liner of a hose.

The hose is deployed from a "blow truck" and carried all the way through the house, and through an access door to the attic. The hose is used to install the insulation from the blow truck to the attic pneumatically. This is typically done when the house is close to completion, and the house has newly painted walls, staircases, and the like. While dragging the hose through the house, the hose may rub against the walls and corners of the house and mark up and/or damage them. In addition, the corrugations may prevent the hose from moving freely during deployment and when removing the hose from the house during clean up. If the corrugated hose becomes caught, the installer may pull on the hose harder, which may damage the walls and slow down the movement of the hose.

Improved apparatus and methods for delivering loosefill insulation are desired.

SUMMARY OF THE INVENTION

In some embodiments, a hose assembly comprises: a flexible corrugated inner hose suitable for conveying and dispensing loose-fill insulation material and a non-conforming outer hose snugly fitted about the inner hose, the outer hose having a substantially cylindrical outer surface that is substantially free of corrugations.

In some embodiments, a method for making a hose comprises the steps of: providing a flexible corrugated inner hose suitable for conveying and dispensing loose-fill insulation material; and snuggly fitting about the inner hose a non-conforming outer hose having a substantially cylindrical outer surface that is substantially free of corrugations.

In some embodiments, a method for dispensing loose-fill insulation comprises the steps of: sliding a hose assembly over or around a building structure, the hose assembly comprising a flexible corrugated inner hose suitable for conveying and dispensing loose-fill insulation material, and a non-conforming outer hose snuggly fit about the inner hose and having a substantially cylindrical outer surface that is substantially free of corrugations; and dispensing the loose-fill insulation through the inner hose.

DETAILED DESCRIPTION

Figure 1:
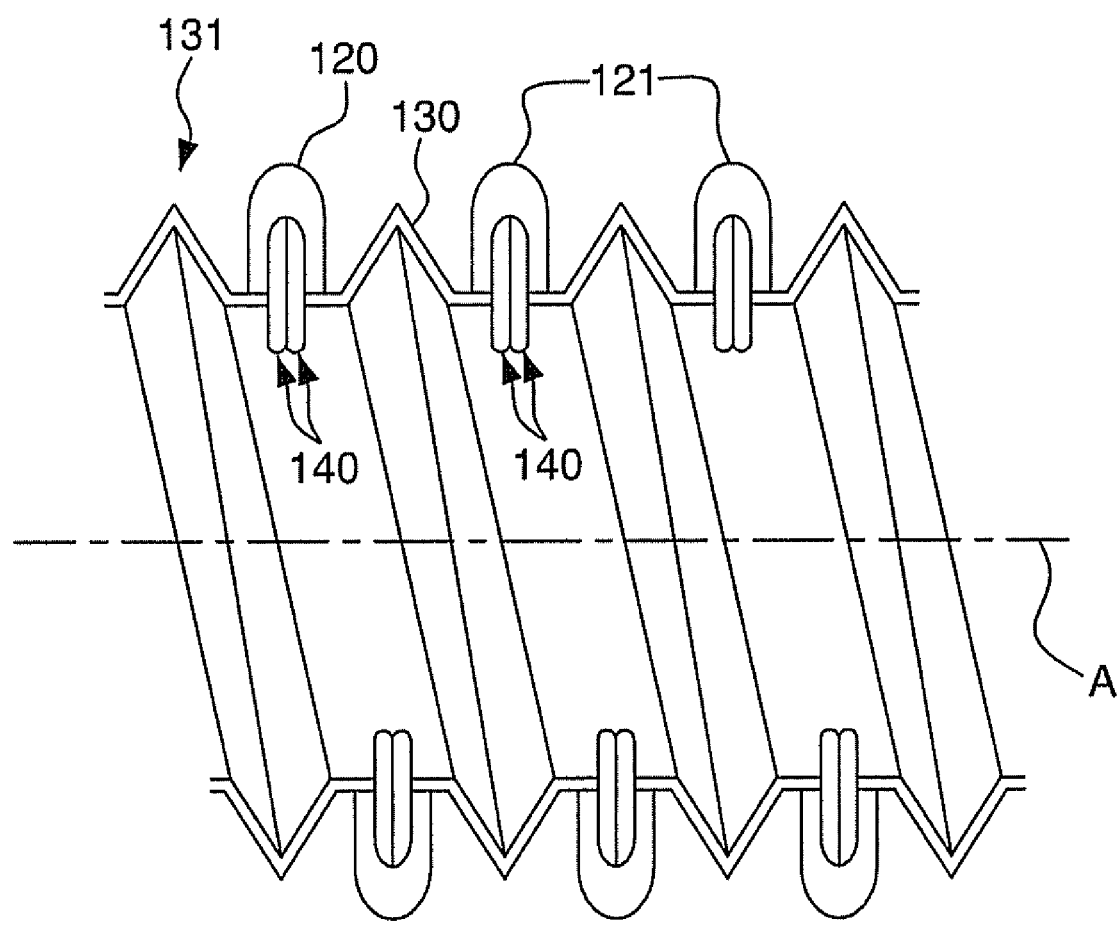
FIG. 1 is a cross-sectional view of a corrugated loose fill insulation dispensing hose of the prior art.

This description of the exemplary embodiments is intended to be read in connection with the accompanying drawings, which are to be considered part of the entire written description. In the description, relative terms such as "lower," "upper," "horizontal," "vertical,", "above," "below," "up,"

"down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
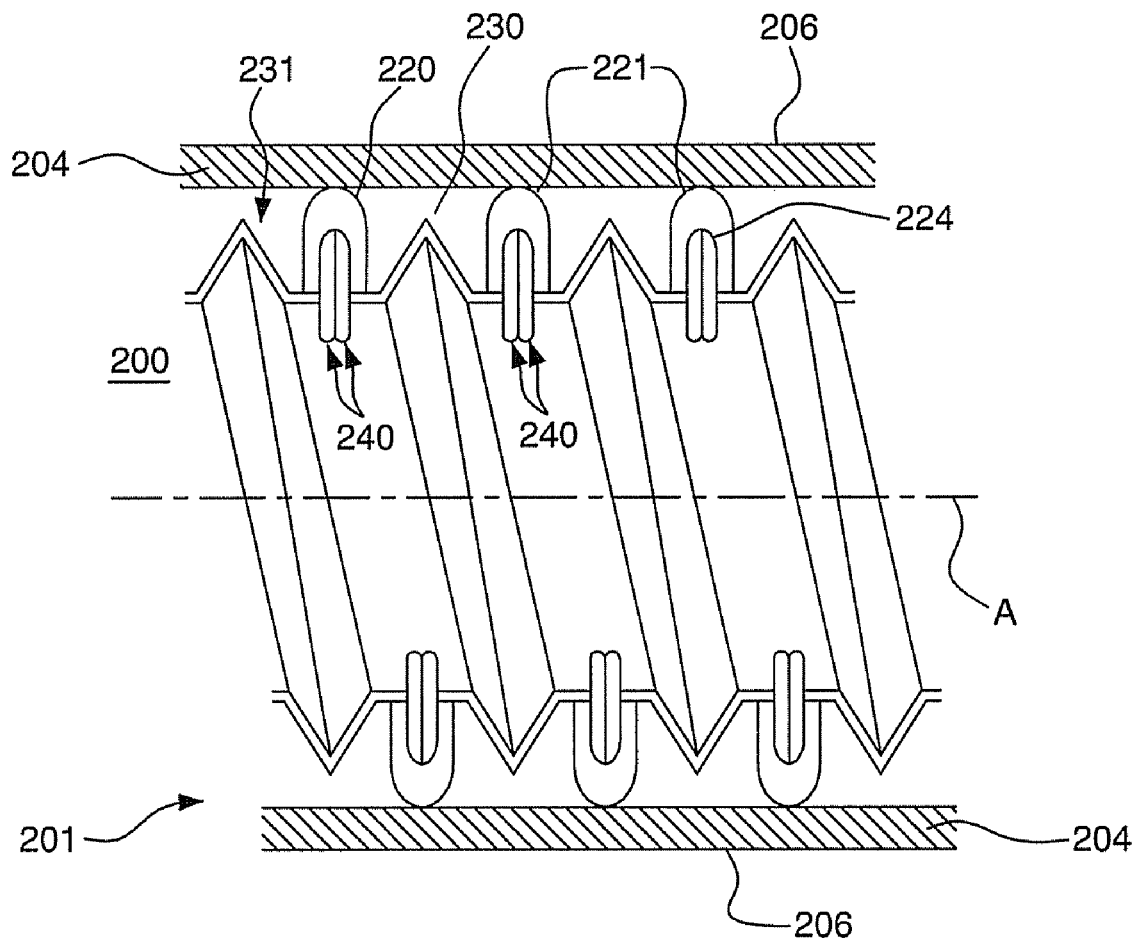
FIG. 2 is a cross-sectional view of a hose according to one embodiment of the invention.
Figure 3:
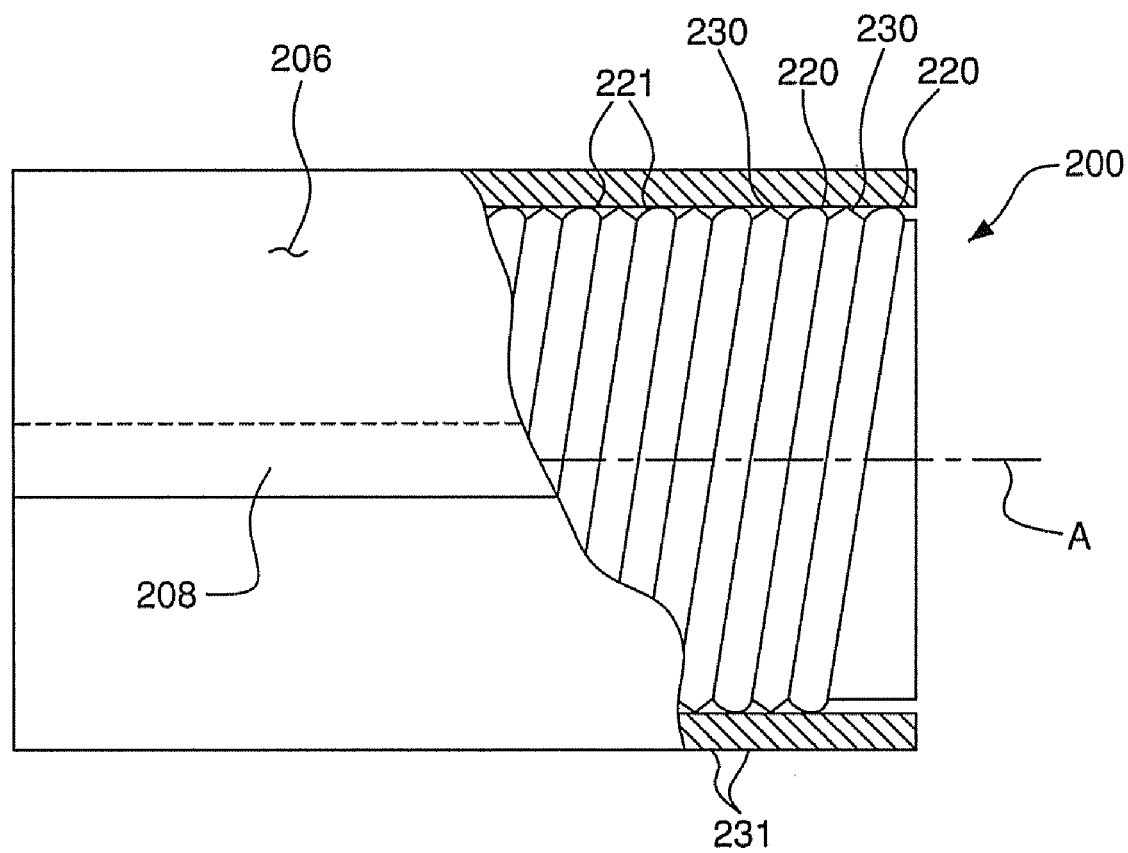
FIG. 3 is a partially cut-away side elevation of the hose of FIG. 2.
Figure 4:
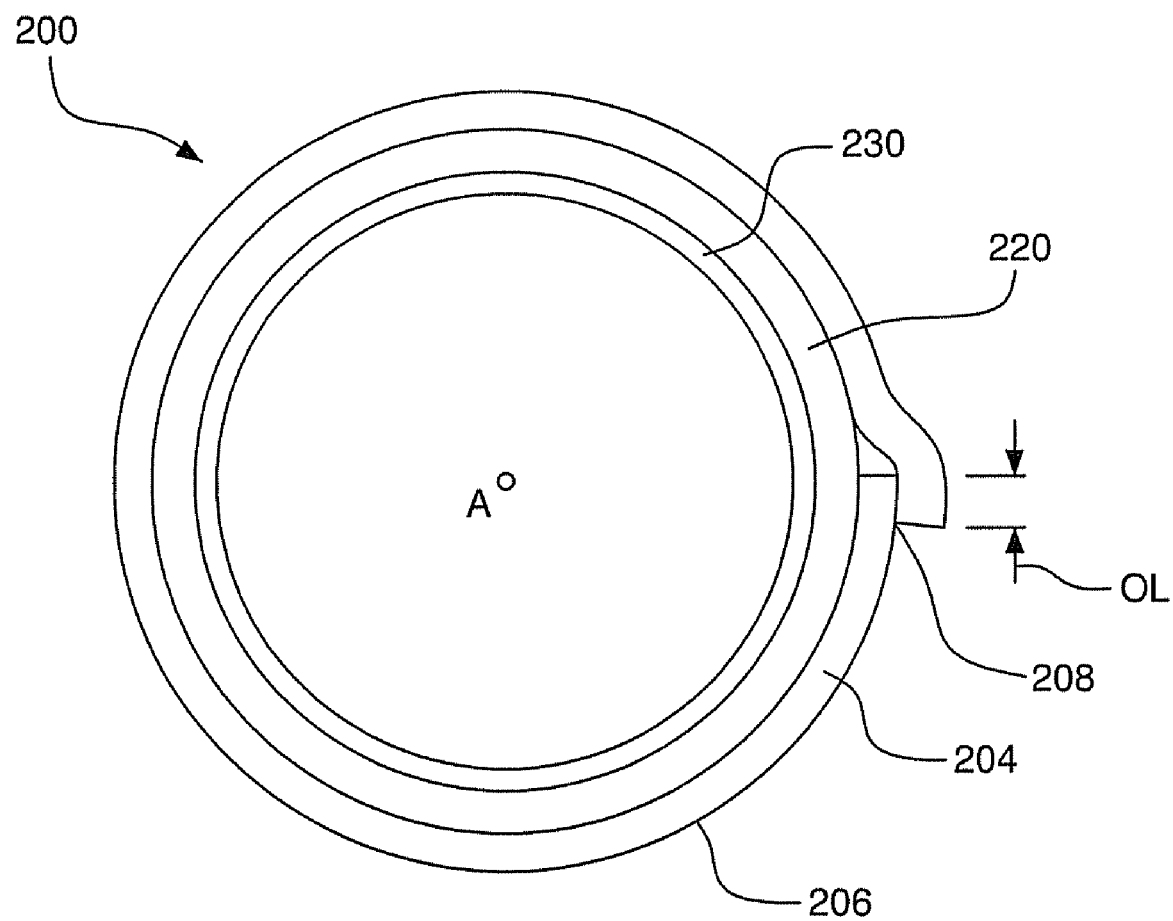
FIG. 4 is an end view of the hose of FIG. 3.

FIGS. 2-4 show an exemplary hose assembly 201 according to one embodiment of the invention. The hose assembly 201 has a flexible corrugated inner hose 200, having a diameter suitable for conveying and dispensing loose-fill insulation material, and a non-conforming outer hose 204, snugly fitted about the inner hose. The outer hose 204 has a substantially cylindrical outer surface 206 that is free of corrugations. The substantially cylindrical outer hose 204 may differ from a perfect cylinder in that it may have an overlap region OL where a longitudinal seam 208 is formed.

In some embodiments, the outer surface 206 of the outer hose 204 is smooth. The outer hose 204 may have a lap joint 208 formed by joining opposing edges of a sheet of material that forms the outer hose 204 (as best seen in FIGS. 3 and 4).

In some embodiments, the outer hose 204 is formed of at least one layer of a polymer, such as polyethylene. Other polymers, such as polypropylene, polyamide, polyvinyl chloride, ABS, polystyrene, polycarbonate, and the like, may be used.

In some embodiments, the outer hose 204 includes two or more layers. For example, in one embodiment, the outer hose comprises a first layer of polyethylene and a second layer of nylon (polyamide). Other combinations of materials may be selected to give the outer hose desired properties, such as strength, flexibility, elasticity, and/or surface texture. Further, one or more layers of the outer hose 204 may include reinforcing fibers (e.g., longitudinal fibers) embedded therein.

In some embodiments, the outer hose 204 is formed from at least one film layer. In other embodiments, the outer hose may include a layer of a woven fabric layer or a non-woven mat layer.

In some embodiments, the outer hose has a thickness between about 0.20 millimeter and about 0.25 millimeter (about 8 mils to about 10 mils). Other thicknesses, e.g., greater than 0.25 millimeter, may be used, so long as the hose assembly remains sufficiently flexible to be folded or wound for storage, and to bend around corners while being carried to the attic of a building; also, the total weight of the hose assembly should be maintained sufficiently low so that a worker can carry the hose through the house to the attic without undue effort.

In some embodiments, the inner hose 200 is configured to condition the loose-fill insulation before it is dispensed into the attic or wall space. In some preferred embodiments, the inner hose 200 may be any of the loose-fill insulation dispensing tubes described in U.S. Pat. No. 6,206,050 (assigned to CertainTeed Corporation), which is incorporated herein by reference as through set forth in its entirety. In such embodiments, the inner hose 200 is a tube comprising: an inner web formed in a tubular shape and having a helical projection disposed along an inner surface thereof extending towards a central longitudinal axis of the inner web, said inner surface of said inner web also forming an inner surface of said tube; and a cap 221 disposed around an outer periphery of the inner web.

As shown in FIGS. 2-4, the inner hose 200 may comprise an inner web 230 surrounded by an outer cap 220. The inner web 230 is formed in a cylindrical shape, and the outer cap 220 is formed as a helical member extending around the outer periphery of the inner web 220. The inner web 230 includes a first helical projection 231 which extends around its entire outer periphery. The inner web 230 also includes a second helical projection 240 which extends around its inner periphery. The first helical projection 231 extends away from a longitudinal axis A of the inner web 230, and the second helical projection 240 extends towards the longitudinal axis A of the inner web 230. The helical projection 240 of inner web 230 extends into the inner portion of the inner hose 200 by a specific length, typically 1/1000 of an inch (0.025 millimeters) to ¼ of an inch (6.35 millimeters), depending on the length of the insulation fiber and the diameter of the inner hose 200. The outer cap 220 comprises a helical member 221 which is wound around the outer periphery of the inner web 230 and which is disposed at a position substantially aligned with helical projection 240, and in between portions of the helical projection 231. In operation, as insulation is blown through the inner hose 200 by an insulation dispensing apparatus, the insulation collides with the different portions of helical projection 240, and is further "opened up" or conditioned.

The materials for both the inner web 230 and outer cap 220 are preferably formed by extrusion of plastic through a die. The plastic may comprise any well known plastic in the art, for example, polypropylene, polyethylene, nylon, urethanes, and polyvinyl chloride may be used. However, these components need not be formed of strictly plastic, and may be formed of any suitable materials, including metals (e.g. aluminum), by any suitable process known to those skilled in the art. The inner web 230 is not formed as a cylindrical member as it is shown in FIGS. 2-4. The web 230 is actually formed as a tape extrusion with a W-shaped cross section (as shown in FIG. 3 of U.S. Pat. No. 6,206,050). The tape is wrapped around a cylindrical rotating mandrel to form the cylindrical inner web 230 shown in FIGS. 2-4. The outer cap 220 is also formed from a tape-like extrusion. The outer cap tape, however, is formed to have an inverted U-shape. The outer cap tape is formed to fit over the projections 224 of two adjacent segments of the inner web tape as shown in FIG. 2. The central open portion of the U-shape is approximately the same width and length as the combined width and length of the two adjacent projections 224.

Although a preferred inner hose 200 is shown and described in detail herein, any corrugated or non-smooth hose suitable for dispensing loose fill insulation material may be used. For example, any of the hoses described in U.S. Pat. Nos. 6,648,022, 6,082,639, 5,389,167, 6,371,148, 6,503,026, or Patent Application Publication No. 2003/0057142, said patents and said publication all incorporated by reference herein in their entireties. These examples are not exclusive, and other hoses having less smooth or irregular outer surfaces may be improved by the addition of a non-conforming, outer hose having a smooth, cylindrical outer surface.

In some embodiments, the outer hose 204 is interference fit over the inner hose 200. This may be accomplished by wrapping a polymer sheet around the inner hose and bonding two opposite edges of the polymer sheet to each other (in overlap section 208) to form a substantially cylindrical tube around the inner hose. The bonding step may include using a hot melt adhesive to bond the opposite edges of the polymer sheet. The adhesive may be a hot melt adhesive such as polyester, polyamide, polyolefin, polypropylene, polyurethane, polycarbonate, butyl or ethylene vinyl acetate (EVA) based adhesives. Hot melt adhesives in a solvated, liquid form, can also be used. They are liquefied by the use of solvents such as toluene, MEK (methyl-ethyl-ketone), acetone, and the like. Once solvated, they are applied in liquid form and solidify upon solvent evaporation. The curable type of hot melt adhesives, known as "hot melt polyurethane adhesives" (i.e., PUR's or HMPUR'S) can also be used, if the adhesive is re-activated (at the time of securing the outer hose 204) before it cures.

In some embodiments, the two opposite edges of the cylindrical tube have an overlap OL (shown in FIG. 4) between about three millimeters and about 5 millimeters. To allow application of the outer hose 204 with a snug fit, the outer hose may be attached while the inner hose 200 is still on the mandrel. The mandrel prevents deformation of the inner hose 200 if pressure is applied unevenly about the circumference of the inner hose at any time during the attachment of the outer hose 204. Alternatively, the inner hose 200 may be placed on another mandrel during application of the outer hose 204.

A method for dispensing loose-fill insulation using the hose assembly 201 comprises sliding the hose assembly 201 over or around a building structure. The hose assembly 201 comprises the flexible corrugated inner hose 200 having a diameter suitable for conveying and dispensing loose-fill insulation material, and the non-conforming outer hose 204 snuggly fit about the inner hose and having a substantially cylindrical outer surface that is free of corrugations. The smooth outer surface 206 of the outer hose 204 slides over walls and floors, and around corners (at intersections of two substantially perpendicular, substantially planar surfaces) without snagging, and avoids damage to corners, paint, and/or wall coverings. The loose-fill insulation is readily dispensed through the inner hose 200.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for making a hose assembly, comprising the steps of:
   (a) forming a flexible corrugated inner hose on a mandrel, the inner hose suitable for conveying and dispensing loose-fill insulation material, including:
      wrapping a tape extrusion helically around the mandrel while the mandrel rotates, the tape having outer edge members, so that outer edges of the tape form a first helical projection extending inward toward a longitudinal axis of the inner hose; and
   (b) snugly fitting a non-conforming outer hose about the inner hose while the inner hose is on the mandrel, the outer hose having a substantially cylindrical outer surface that is substantially free of corrugations,
   wherein the outer edges of the tape further comprise an outwardly extending member, so that the forming step forms a second helical projection extending away from a longitudinal axis of the inner hose; and the forming step further includes:
      wrapping an extruded U-shaped cap helically around the tape extrusion, to join adjacent outer edge portions of the tape to form a continuous helical tube,
   wherein step (b) includes wrapping the outer hose around the inner hose so that the outer hose contacts the U-shaped cap along the helical path of the U-shaped cap
   wherein the outer hose is interference fit over the inner hose by wrapping a polymer sheet around the inner hose and bonding two overlapping opposite edges of the polymer sheet to each other using a hot melt adhesive to form a substantially cylindrical tube around the inner hose,
   wherein the outer hose comprises a first layer of polyethylene and a second layer of nylon.

2. The method of claim 1, wherein the two opposite edges of the cylindrical tube have an overlap between about three millimeters and about 5 millimeters.

3. The method of claim 1, wherein the inner hose comprises one of the group consisting of polypropylene, polyethylene, nylon, urethanes, and polyvinyl chloride.

4. A method for making a hose, comprising the steps of:
   forming a flexible corrugated inner hose on a mandrel, the inner hose suitable for conveying and dispensing loose-fill insulation material, including:
      wrapping a tape extrusion helically around the mandrel while the mandrel rotates, the tape having outer edge members, so that outer edges of the tape form a first helical projection extending away from a longitudinal axis of the inner hose; and
      wrapping an extruded U-shaped cap helically around the tape extrusion, to join adjacent outer edge portions of the tape to form a continuous helical tube; and
   snuggly fitting about the inner hose a non-conforming outer hose while the inner hose is on the mandrel, the outer hose having a substantially cylindrical outer surface that is substantially free of corrugations,
   wherein the fitting step includes wrapping the outer hose around the inner hose so that the outer hose contacts the U-shaped cap along the helical path of the U-shaped cap
   wherein the outer hose is interference fit over the inner hose by wrapping a polymer sheet around the inner hose and bonding two overlapping opposite edges of the polymer sheet to each other using a hot melt adhesive to form a substantially cylindrical tube around the inner hose
   wherein the outer hose comprises a first layer of polyethylene and a second layer of nylon.

5. The method of claim 4, wherein the outer surface of the outer hose is smooth.

6. The method of claim 4, wherein the tape has inwardly extending outer edge members, so that outer edges of the tape form a second helical projection extending inward towards a longitudinal axis of the inner hose.

7. The method of claim 4, wherein the inner hose comprises one of the group consisting of polypropylene, polyethylene, nylon, urethanes, and polyvinyl chloride.

8. A method for making a hose assembly, comprising the steps of:
   (a) forming a flexible corrugated inner hose on a mandrel, the inner hose suitable for conveying and dispensing loose-fill insulation material, including:
      wrapping a tape extrusion helically around the mandrel while the mandrel rotates, the tape having outer edge members, so that outer edges of the tape form a first helical projection extending inward toward a longitudinal axis of the inner hose; and
   (b) snugly fitting a non-conforming outer hose about the inner hose while the inner hose is on the mandrel, the outer hose having a substantially cylindrical outer surface that is substantially free of corrugations, wherein:
      the outer edges of the tape further comprise an outwardly extending member, so that the forming step forms a second helical projection extending away from a longitudinal axis of the inner hose; and the forming step further includes wrapping an extruded U-shaped cap helically around the tape extrusion, to join the second helical projections of adjacent outer edge portions of the tape to form a continuous helical tube;

step (b) includes: wrapping a polymer sheet around the inner hose so that the outer hose contacts the U-shaped cap along the helical path of the U-shaped cap, and bonding two opposite longitudinal edges of the polymer sheet to each other to form a cylindrical tube around the inner hose using a hot melt adhesive to bond the opposite edges;

the outer hose comprises a first layer of polyethylene and a second layer of nylon; and the inner hose comprises one of the group consisting of polypropylene, polyethylene, nylon, urethanes, and polyvinyl chloride.

* * * * *